(12) United States Patent
Dickson

(10) Patent No.: US 7,009,999 B2
(45) Date of Patent: Mar. 7, 2006

(54) SELECTIVE VARIABLE RATE ENCODING TO REGULATE DATA FRAME SIZE

(75) Inventor: Scott Dickson, Carlsbad, CA (US)

(73) Assignee: Qualcomm Incorporated, San Diego, CA (US)

(*) Notice: Subject to any disclaimer, the term of this patent is extended or adjusted under 35 U.S.C. 154(b) by 83 days.

(21) Appl. No.: 10/443,527

(22) Filed: May 21, 2003

(65) Prior Publication Data

US 2004/0190510 A1    Sep. 30, 2004

Related U.S. Application Data

(60) Provisional application No. 60/458,983, filed on Mar. 28, 2003.

(51) Int. Cl.
*H04J 3/16* (2006.01)
(52) U.S. Cl. .................................... 370/468; 370/465
(58) Field of Classification Search .............. 370/352, 370/335, 342, 358, 391, 437, 465, 468, 479, 370/329, 341, 392, 395.41, 467; 375/262, 375/265
See application file for complete search history.

(56) References Cited

U.S. PATENT DOCUMENTS

| | | | |
|---|---|---|---|
| 5,414,796 A | | 5/1995 | Jacobs et al. ................. 395/2.3 |
| 5,515,375 A | | 5/1996 | DeClerck ....................... 370/84 |
| 6,049,537 A | * | 4/2000 | Proctor et al. ............... 370/342 |
| 6,389,001 B1 | * | 5/2002 | Lee .............................. 370/342 |
| 6,418,147 B1 | * | 7/2002 | Wiedeman .................... 370/468 |
| 6,738,391 B1 | * | 5/2004 | Kim et al. .................... 370/468 |
| 2001/0048709 A1 | * | 12/2001 | Hoffmann et al. .......... 375/130 |

* cited by examiner

*Primary Examiner*—Phirin Sam

(74) *Attorney, Agent, or Firm*—Abdollan Katbob; Micky Minnas; Phil Wadsworth

(57) ABSTRACT

A determination of a coding rate dependent on the size of data frames previously coded or the space remaining for data frames. A variable rate coder creates a data frame. The rate of the variable rate coder is set by examining the amount of space remaining in a data packet, which is at least partially comprised of data frames produced by the variable rate coder. Alternatively examining the amount of space used by previous data frame(s) may set the rate of the variable rate coder.

34 Claims, 7 Drawing Sheets

SELECTIVE VARIABLE RATE ENCODING TO REGULATE DATA FRAME SIZE

RELATED APPLICATIONS

The present application claims priority of U.S. provisional application Ser. No. 60/458,983 filed Mar. 28, 2003 entitled "Selective Variable Rate Encoding to Regulate data Frame Size," incorporated herein by reference.

FIELD

This invention relates to data encoding for capacity constrained channels, and in particular embodiments to variable encoding of digital voice data for transmission over a communication channel.

BACKGROUND

Channels are defined paths for carrying signals. Channels may comprise radio frequency channels, optical channels, wired channels, or any other path, which can carry data. Channels inherently have a maximum capacity. One way to improve the utilization of channels is to process data before transmission, for example by applying compression methods. Accordingly there is need in the art for apparatus and methods to process data that will be transmitted over a finite capacity channel.

The terms frame and data frame are used synonymously herein. The term rate, as used herein is used to refer to the size of data frames produced by a variable rate encoder. Given the same input, a full rate encoding will produce a data frame on the order of twice the size of a half rate encoding. Accordingly the size of a frame and the rate of an encoder are both used to identify the size of data frames produced by a variable rate encoder.

SUMMARY

In a first embodiment a system for creating a data packet from a plurality of data frames provided by a variable rate coder is illustrated. The method includes determining a maximum size the plurality of data frames may occupy in the data packet, accepting a first data frame of the plurality of data frames, to be incorporated into the data packet, from the variable rate coder, determining a size the remaining plurality of data frames may occupy in the data packet, and providing a maximum rate to the variable rate coder dependent on the size the remaining plurality of data frames may occupy in the data packet.

In another embodiment a system for creating a data packet from a plurality of data frames provided by a variable rate coder is illustrated. The system includes determining a maximum size the plurality of data frames may occupy in the data packet, accepting a first data frame of the plurality of data frames, to be incorporated into the data packet, from the variable rate coder, determining an average size for the remaining plurality of data frames that may occupy the data packet, forming a comparison by comparing average size of the remaining plurality of data frames may occupy in the data packet to the average size of at least one previously coded frame, and providing a maximum rate to the variable rate coder based on the comparison.

In another embodiment a system for controlling a variable rate vocoder is illustrated. The system includes accepting an initial data frame, to be incorporated into a data frame bundle, from the vocoder, determining how much space remains in the data bundle when the initial frame is incorporated into the data frame bundle, using the space remaining in the data bundle to determine the sustained rate for the remaining packets, and setting a maximum rate, for the variable vocoder, at the highest available rate less than or equal to the sustained rate.

In another embodiment a system for creating an over the air packet in a cellular telephone is illustrated. The system includes accepting an input to the cellular telephone, conditioning the input appropriately, providing the conditioned input to a variable rate coder, forming data frames at a maximum rate, and controlling the maximum rate based on the rate of the data frames and the amount of space available for a data frames.

BRIEF DESCRIPTION OF THE DRAWINGS

The present disclosure is illustrated in conjunction with the figures in which reference identifiers identify corresponding elements throughout. In the drawings, like reference identifiers generally indicate identical, functionally similar and/or structurally similar elements. The drawing in which an element first appears is indicated by the leftmost digit(s) in the corresponding reference identifier.

DETAILED DESCRIPTION OF ILLUSTRATIVE EMBODIMENTS

Figure 1:
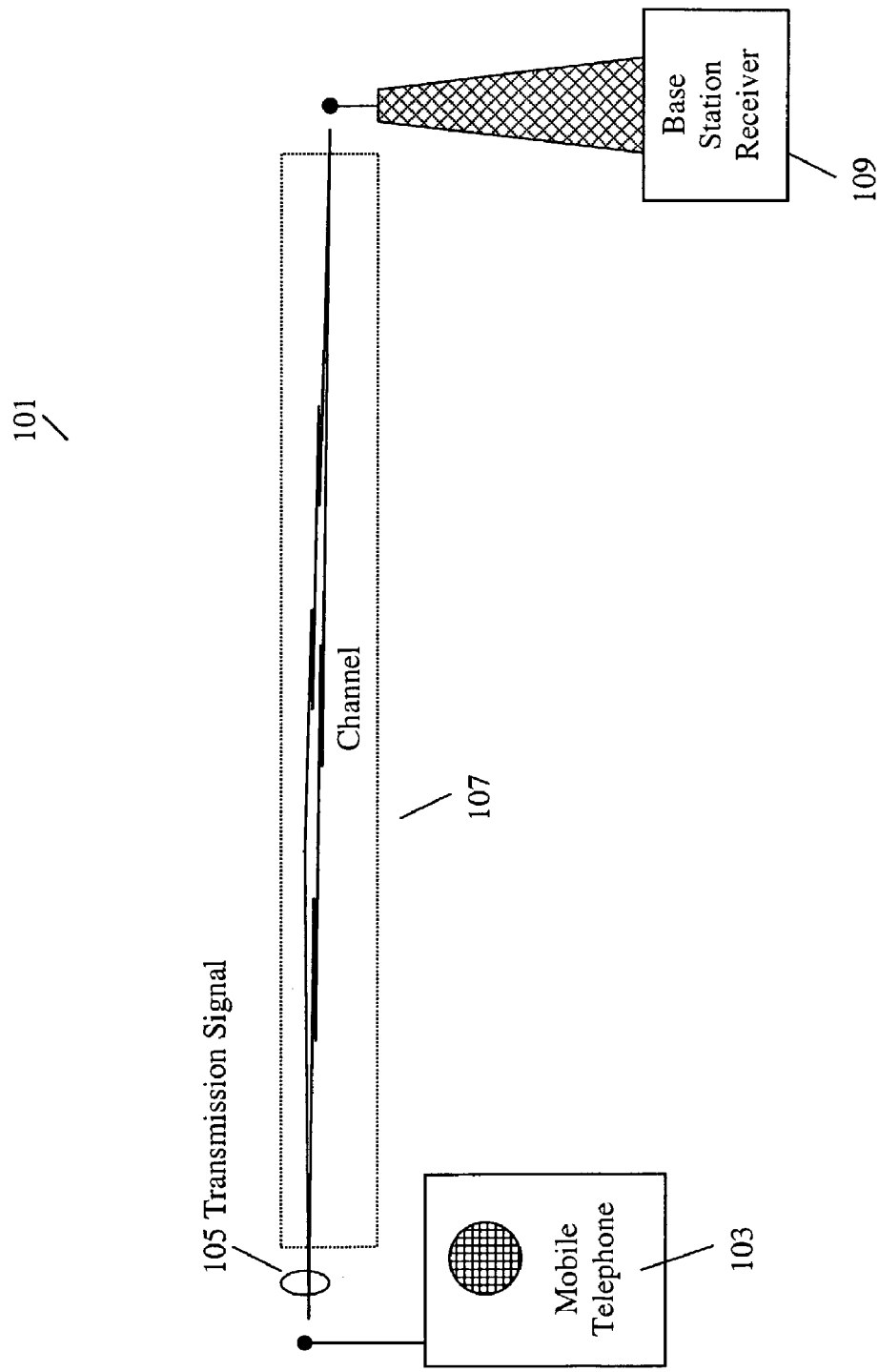
FIG. 1 is a graphic illustration of an environment in which an illustrative embodiment of the invention may operate.

FIG. 1 is a graphic illustration of an environment in which an illustrative embodiment of the invention may operate. The environment illustrated in FIG. 1 is a mobile telephone system 101. Mobile telephone 103 provides a transmission signal 105 to a channel 107. Channel 107 is illustratively a mobile telephone channel, such as a CDMA (Code Division Multiple Access), TDMA (Time Division Multiple Access), GSM (Global System for Mobile Communications) or the like. A base station receiver 109 accepts the transmission signal 105 from the channel 107, and may in turn provide the data content of the transmission signal to a communication network, such as POTS (Plain Old Telephone System) not illustrated in FIG. 1. Those skilled in the art will however recognize that the teachings herein may be applied to any capacity constrained channel, and mobile telephone channel 107 is chosen by way of illustration and not limitation.

Figure 2:
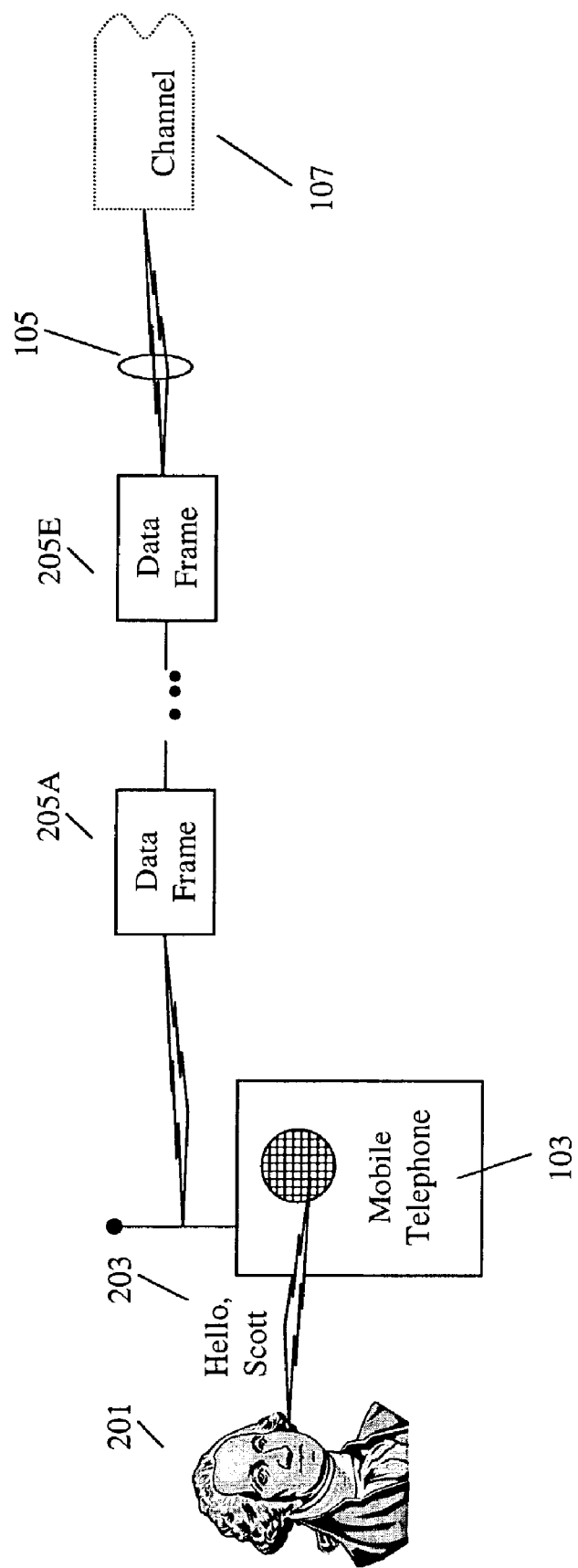
FIG. 2 is a graphic illustration of voice data transmission.

FIG. 2 is a graphic illustration of voice data transmission. A user 201 provides a verbal input 203 to the mobile telephone 103. Mobile telephone 103 accepts the verbal input 203 and converts it into data frames, for example 205A through 205E, which are included in the transmission signal 105. The data frames are provided to the channel 107.

Figure 3:
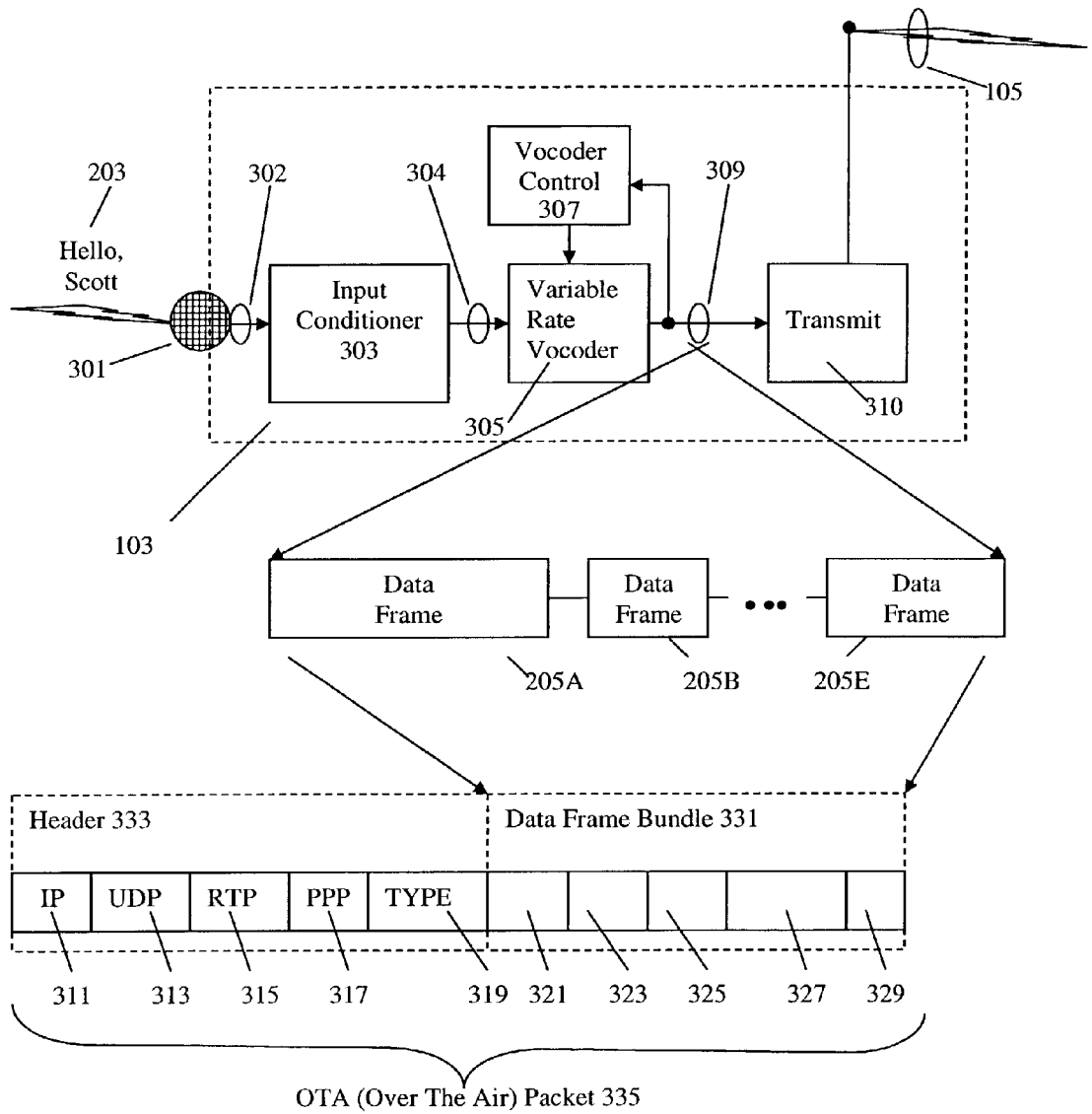
FIG. 3 is a graphic illustration showing further detail of the voice data transmission illustrated in FIG. 2.

FIG. 3 is a graphic illustration showing further detail of the voice data transmission illustrated in FIG. 2.

In FIG. 3, variable rate vocoder 305 has its coding rate controlled by vocoder control block 307. The vocoder control block 307 sets the rate at which the vocoder operates. Commonly the vocoder control block 307 sets the vocoder 305 coding rate to match the capacity of the channel 107 which will be used to convey the verbal input 203. The vocoder 305 provides data frames 205A through 205E to the transmission block, which converts the data frames into a suitable transmission signal 105.

More specifically verbal input 203 is provided to-the mobile telephone 103, where it is converted to an electrical signal 302 using a microphone 301. The electrical signal 302 is then provided to an input conditioner and digitizer 303, and is processed and converted to a digital representation 304. The digitized signal 304 is then provided to a variable rate vocoder 305.

Vocoders are audio processors that capture characteristics of an audio signal, in order to use the characteristics for audio signal compression. Commonly variable rate vocoders, which are one type of variable rate coder, may produce audio signal compression by variable rate coding of frames of digitized audio samples. Variable rate vocoders are well known in the art, for example see U.S. Pat. No. 5,414,796 entitled "VARIABLE RATE VOCODER", which is incorporated by reference herein.

Variable rate vocoder 305 is selected to conform to the present illustrative embodiment. Those skilled in the art will recognize that any variable rate codec, or any mechanism that can accept an input and produce a varying bit length encoding, or merely sizing, of that input can be used in other embodiments without departing from the scope and spirit of the present disclosure.

In the present embodiment the variable rate vocoder has its rate controlled, at least in part, by a variable rate coder control, such as vocoder control 307. Variable rate vocoder 305 produces data frames, e.g. 205A through 205E, of varying sizes i.e. different number of bits, as illustrated in FIG. 3. Data frames 205A through 205E are combined into a data frame bundle 331. Data frame bundle 331 is combined with a header 333 to form an over the air (OTA) packet 335. The over the air packet 335 is provided to a transmit unit 310, which incorporates the OTA packet, to create a transmission signal 105.

Header 333 may include a variety of information as illustrated in FIG. 3. For example header 333 may include IP (Internet protocol) information 311, UDP (Universal Datagram Protocol) information 313, RTP (Real Time Protocol) information 315, PPP (Point to Point Protocol) information 317, and Type information 319, which indicates what type of data is included in the data frame bundle 331. Those skilled in the art will recognize that header information is not limited to the examples given, and may not include all the exemplary fields just described. Additionally the header may vary in size, for example as signaling data is added.

Commonly over the air packets, such as 335, are of a fixed size, or at least a fixed maximum size. In the present embodiment data frames 205A through 205E represent coding of 20 milliseconds of speech each. Since there are 5 data frames included in the over the air packet 335, the entire over the air packet 335 represents 100 milliseconds of speech. If the packet 335 were so long that it took more than 100 milliseconds to transmit then the mobile telephone's 103 ability to transmit speech in real time would be impaired as it would take more than 100 milliseconds to transmit 100 milliseconds of speech. Accordingly the size of the data frame bundle 331, in this instance, is limited by timing considerations, and may be adjusted as the header 333 expands or contracts, for example to include signaling data or differing amounts of overhead.

Vocoders in general take advantage of speech characteristics. In the present embodiment the variable rate vocoder may accept speech input 304 and produce variable size data frames, e.g. 205A through 205E, depending on the content of the speech input 304. Commonly frame size adjustment is based on average speech. Such consideration as quality of speech and statistical analysis of speech may be taken into consideration.

Figure 4:
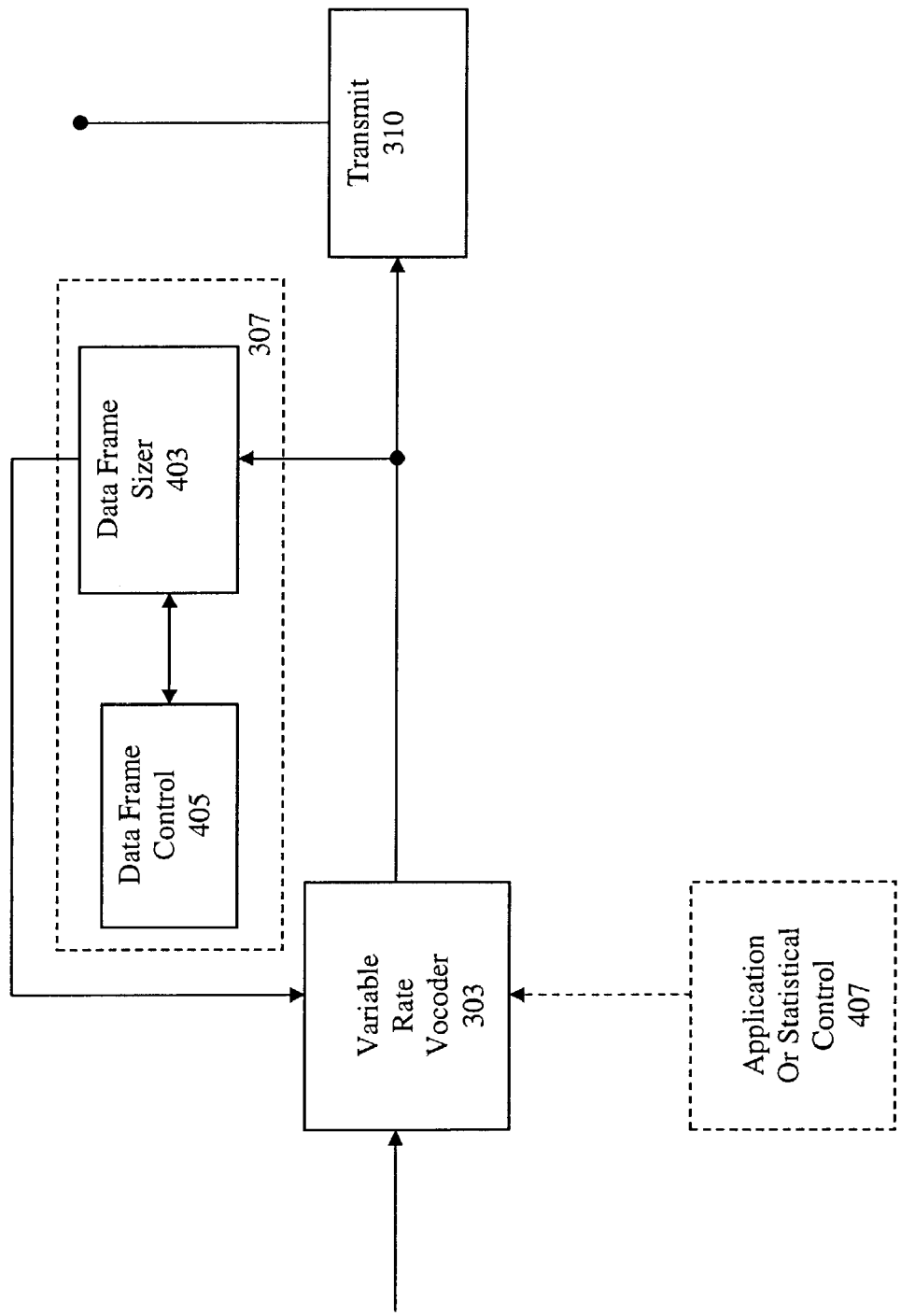
FIG. 4 is a block diagram according to an illustrative embodiment of the invention.

FIG. 4 is a block diagram illustrating an embodiment of the invention. FIG. 4 also illustrates, at 407, a common way that that a variable rate vocoder may be controlled. A variable rate vocoder rate may be set by application or statistical control block 407 as follows. An application, using application or statistical control block 407, may set a maximum rate so that data frames 205A through 205E will fit into data bundle 331. Alternatively a maximum may be set by application or statistical control block 407, using a statistical analysis of speech. The vocoder 303 may use a maximum frame rate that will statistically allow most of the data frames to fit within the data frame bundle 331, knowing that the vocoder 303 may also produce a lower frame rate for some frames depending on the speech input. In such a case if the sum of the data frame lengths is too large to fit in the data frame bundle, the data frames that don't fit may simply be dropped, and minor speech degradation may occur.

FIG. 4 illustrates an embodiment of the present invention having an alternative or complement to the vocoder application or statistical control 407, by using vocoder control 307. Vocoder control 307 examines the size of the data frames produced by the vocoder 303, for example by monitoring the output of the vocoder 303 as shown. The data frame sizer 403 then may control the variable rate vocoder 303, according to instructions provided to it by data frame control 405. Data frame sizer 403 may be commanded, for example, to set a maximum size for each successive frame, thereby controlling the size of each frame individually. Those skilled in the art will recognize that the use of vocoder control 307 may either replace or compliment the application or statistical control block 407. The operation of the vocoder control 307 is explained with respect to the diagram of FIG. 5.

Figure 5:
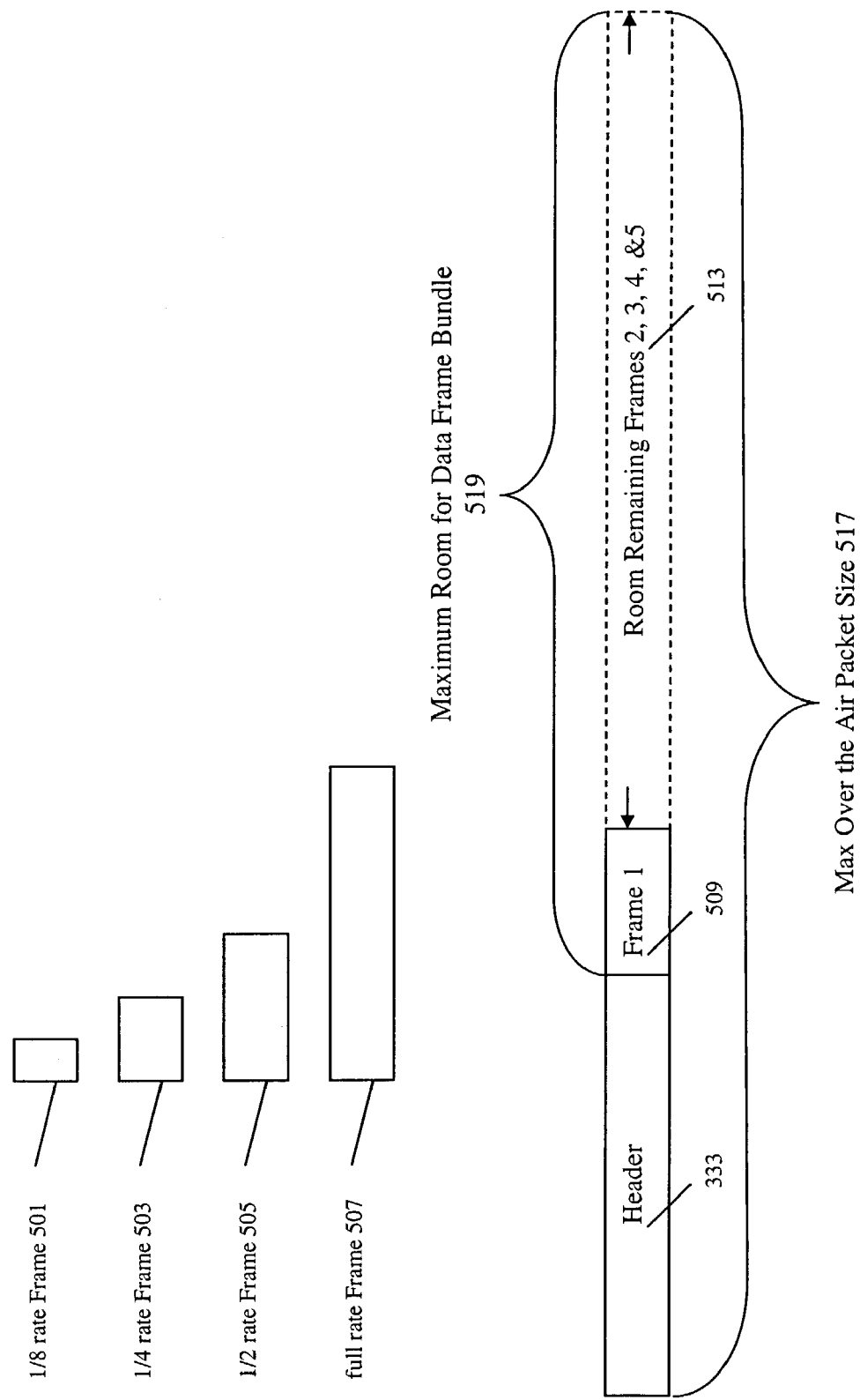
FIG. 5 is a data diagram for illustrating embodiments of the invention.

FIG. 5 is a data diagram for illustrating embodiments of the invention. In FIG. 5 relative sizes of data frames, which may be produced by variable rate vocoder 303, are illustrated. Variable rate vocoder 303 may produce an eighth rate frame 501, a quarter rate frame 503, a half rate frame 505, or a full rate frame 507. The frame sizes produced by variable rate vocoder 303 are used for illustrative purposes. Those skilled in the art will realize that a coder, according to alternate embodiments of the invention, may produce more or less than the four frame sizes illustrated, and may produce different frame sizes than those illustrated. In the present example the eighth rate frame 501 comprises 16 bits, the quarter rate frame 503 comprises 40 bits, the half rate frame 505 comprises 80 bits and the full rate frame 507 comprises 171 bits. Also in the given exemplary embodiment the over the air packet 335 is 100 milliseconds long and each of the five data frames 205A through 205E represents 20 milliseconds of encoded speech.

In the present embodiment, a maximum size for an over the air packet 517 is determined. The maximum size 517 may be determined by a particular application, for example running in the mobile telephone 103. The maximum size 517 will ordinarily determine the maximum size available for data frame bundles 519. The size of header 333 may change from one over the air packet to another. Accordingly the maximum size available for data frame bundles can also change from one over the air packet to another.

In one embodiment of the invention the size of a first frame 509 is determined by either the variable rate vocoder 303 itself, or the application or statistical control block 407 or the combination of both. The variable rate vocoder 303 may determine, from speech content for example, that frame 1, i.e. 205A, will be a quarter rate frame, alternately the application or statistical control block 407 may determine that frame 1 509 will be a maximum of half rate frame. Accordingly, once the size of the first frame has been determined, the room remaining in the data frame bundle may be updated and used to determine a maximum rate for the remaining frames. Therefore the data frame sizer 403, variable rate vocoder 303, or the application or statistical control model, or any combination thereof may determine the size of the second frame. For example the data frame sizer 403 may determine that a maximum of a half rate frame is acceptable as the size for the second frame 205B. If the application or statistical control 407 allows any frame to be a full rate frame, then the second frame 205B will be limited to the size of a half rate frame by the data frame sizer 403. The variable rate vocoder 303 may want to use a full rate frame, but the maximum size will be limited to a half rate frame by the data frame sizer 403. In contrast the variable rate vocoder 303 may want to use a quarter rate frame, which is less that the maximum size that can be accommodated according to the data frame sizer 403, and so frame 205B will be a quarter rate frame. Since the actual frame size may be determined by the data frame size 403, variable rate vocoder 303, or application or statistical control block 407, or any combination thereof, the actual size of the frame size will be determined on the fly, with subsequent frame size being, at least in part, decided by past and present data frame size. The data frame sizer 403, in conjunction with the data frame control 405, will use the combined actual size of the present and past data frames, which have been already determined, to set the maximum size of a subsequent frame. The data frame control 403 will use rules contained in the data frame sizer 405 to set a maximum size for subsequent data frames depending on the amount of room remaining and the number of frames remaining to be encoded for any given over the air packet 517. Those skilled in the art will recognize that the division of vocoder control 307 into a data frame sizer 403 and data frame control is arbitrary and used for illustrative purposes only.

Figure 6:
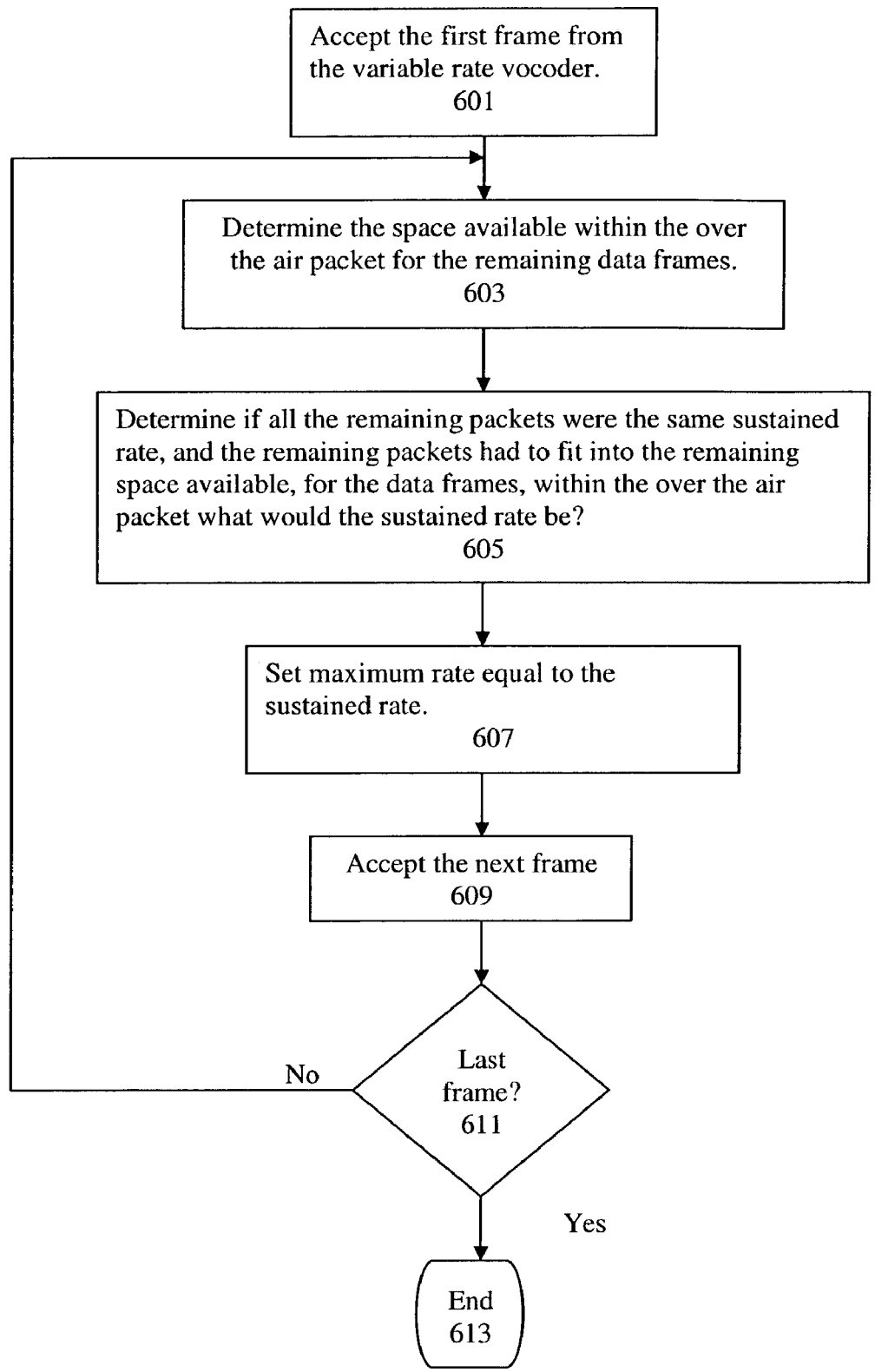
FIG. 6 is a flow diagram of a first method by which the data frame control may control the maximum rate of a subsequent frame based on the data space remaining for data frames.

FIG. 6 is a flow diagram of a first method by which the data frame control may control the maximum rate of a subsequent frame that is set by the data frame sizer 307 based on the average space remaining.

In block 603 the first frame of a new data frame bundle is accepted. The maximum size for the first packet may be set arbitrarily, by the application or statistical control block 407, if one is present, or it may be set by the variable rate vocoder itself depending on the speech input.

Once the first frame has been accepted 601 the space left within the data frame bundle 331 for the remaining data frames is calculated as indicated in block 603.

In block 605 the rate that can be sustained for the remaining data frames is calculated. This "sustained rate" is the rate that can be continued for all the remaining frames and have the remaining frames fit into the room remaining for the data frame bundle.

In block 607 the maximum data rate is set to the highest available rate less than or equal to the sustained rate calculated in block 60.

The next frame, constrained by the maximum data rate set in block 607, is accepted in block 609.

If the final frame has been generated for the present over the air packet, then the process ends in block 613, if not the process continues with block 603.

Figure 7:
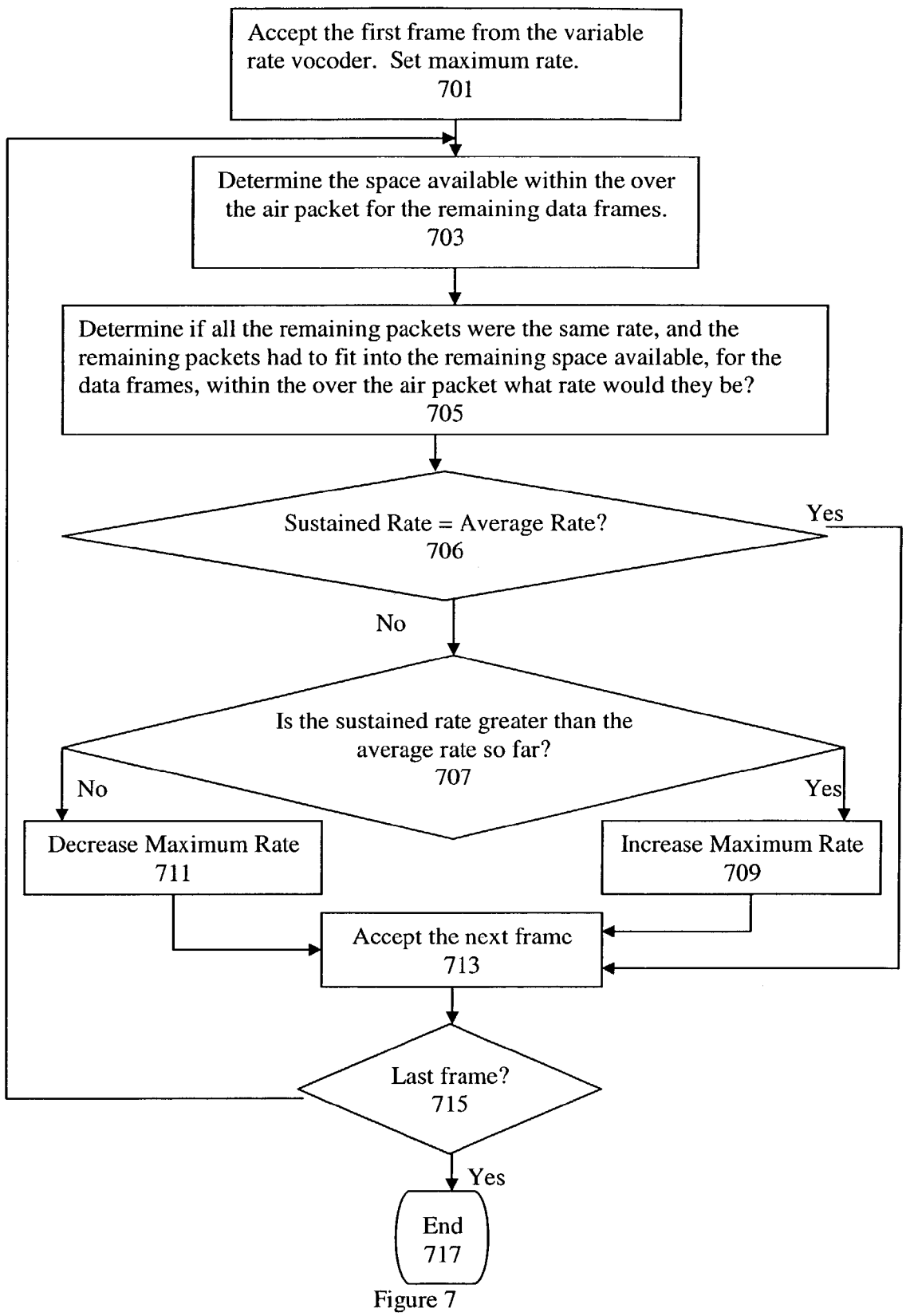
FIG. 7 is a flow diagram of a second method by which the data frame control may control the maximum size of a subsequent frame based on the average rate of previous frames.

FIG. 7 is a flow diagram of a second method by which the data frame control may control the maximum size of a subsequent frame based on the average rate of previous frames.

In block 703 the first frame of a new data frame bundle is accepted. The maximum size for the first packet may be set arbitrarily, by the application or statistical control block 407, if one is present, or it may be set by the variable rate vocoder itself depending on the speech input.

Once the first frame has been accepted the space left within the data frame bundle 331 for the remaining data frames can be calculated in block 705.

In block 705 the rate that can be sustained for the remaining data frames is calculated. This "sustained rate" is the rate that can be continued for all the remaining packets and have them fit into the room remaining for the subsequent frames.

In block 706 the sustained rate is compared to the average rate for frames generated thus far. Frames generated thus far may be the frames for the present OTA packet or some kind of more extensive average, such as over the last 100 frames. If they are equal block 713 is executed next, otherwise block 707 is next.

In block 707 the sustained rate is compared to the average rate of the frames accepted in the present OTA packet 335. If the sustained rate is greater than the average rate the maximum rate is increased in block 709. If the sustained rate is less than the average rate the maximum rate is decreased in block 711.

The next frame, constrained by the maximum rate, is accepted in block 713.

If the final frame has been generated for the present over the air packet, then the process ends in block 717, if not the process continues with block 703.

Those skilled in the art will realize that the methods illustrated in FIG. 6 and FIG. 7 may be combined and a minimum rate selected from the rate determined by each method.

The embodiments presented are generally illustrated in terms of a variable vocoder and a cellular telephone channel. Those skilled in the art will realize that the teachings herein are merely exemplary and can be applied in a wide variety of variable rate coding applications. For example the present teachings can be applied to any variable rate coder and any channel using any desired constraint and the principals will remain consistent with the present disclosure. Additionally functions described as circuitry functions can equivalently be implemented by a processor running the necessary software, a state machine, or the like.

What is claimed is:

1. A method for creating a data packet from a plurality of data frames provided by a variable rate coder, the method comprising:

determining a maximum size the plurality of data frames may occupy in the data packet;

accepting a first data frame of the plurality of data frames, to be incorporated into the data packet, from the variable rate coder;

determining a size of the remaining plurality of data frames may occupy in the data packet; and providing a maximum rate to the variable rate coder dependant on the size of the remaining plurality of data frames may occupy in the data packet.

2. The method of claim 1 wherein determining a maximum size the plurality of data frames may occupy in the data packet further comprises:

determining the maximum size of the data packet;

determining a maximum size the plurality of data frames may occupy in the data packet; and subtracting the maximum size the plurality of data frames may occupy in the data packet from the maximum size of the data packet.

3. A method for creating a data packet from a plurality of data frames provided by a variable rate coder, the method comprising:

determining a maximum size the plurality of data frames may occupy in the data packet;

accepting a first data frame of the plurality of data frames, to be incorporated into the data packet, from the variable rate coder;

determining an average size of the remaining plurality of data frames may occupy in the data packet;

forming a comparison by comparing the average size that the remaining plurality of data frames may occupy in the data packet to the average size of at least one previously coded frame; and providing a maximum rate to the variable rate coder based on the comparison.

4. The method of claim 3 wherein determining a maximum size the plurality of data frames may occupy in the data packet further comprises:

determining the maximum size of the data packet;

determining a maximum size the plurality of data frames may occupy in the data packet; and subtracting the maximum size the plurality of data frames may occupy in the data packet from the maximum size of the data packet.

5. A meted for controlling a variable rate vocoder, the method comprising:

A) accepting an initial data frame, to be incorporated into a data frame bundle, from the vocoder;

B) determining how much space remains in the data bundle when the initial frame is incorporated into the data frame bundle;

C) using the space remaining in the data bundle to determine the sustained rate for the remaining packets; and D) setting a maximum rate, for the variable vocoder, equal to the sustained rate.

6. The method of claim 5 wherein accepting an initial data frame further comprises setting a maximum rate, of the variable frame vocoder, for the initial data frame.

7. The method of claim 5 wherein determining how much space remains in the data bundle further comprises:

determining a maximum size for an over the air packet, of which the data frame bundle will be a part;

determining a size of a header which will comprise a portion of the over the air packet;

subtracting, from the maximum size for an over the air packet, the size of the header and a size of the initial frame.

8. The method of claim 5 further comprising repeating B) through D) until all frames which will be incorporated into the data frame bundle are incorporated into the data frame bundle.

9. A method for controlling a variable rate vocoder, the method comprising:

A) accepting, from the vocoder, an initial data frame to be incorporated into a data frame bundle;

B) determining how much space remains in the data bundle when the initial frame is incorporated into the data frame bundle;

C) using the space remaining in the data bundle to determine the sustained rate for the remaining packets; and D) setting a maximum rate, for the variable vocoder, equal to the sustained rate.

10. The method of claim 9 further comprising:

accepting additional data frames; and repeating B), C) and D) until all frames, which will be incorporated in the data frame bundle, are incorporated in the data frame bundle.

11. A method of creating an over the air packet in a cellular telephone, the method comprising:

accepting an input to the cellular telephone;

conditioning the input appropriately;

providing the conditioned input to a variable rate coder;

forming data frames at a maximum rate;

controlling the maximum rate based on the rate of the data frames and the amount of space available for a data frames.

12. The method of claim 11, wherein the accepting an input to the cellular telephone comprises accepting a voice input.

13. The method of claim 12 wherein conditioning the input appropriately includes digitizing the input.

14. The method of claim 11 wherein controlling the maximum rate comprises controlling the maximum rate based on the rates of already formed data frames.

15. The method of claim 11 wherein controlling the maximum rate comprises controlling the maximum rate based on the sustained rate.

16. An apparatus for creating a data packet from a plurality of data frames provided by a variable rate coder, the method comprising:

a data frame control for determining a maximum size the plurality of data frames may occupy in the data packet;

a data frame sizer for accepting a first data frame of the plurality of data frames, to be incorporated into the data packet, from the variable rate coder;

a variable rate coder control that determines a size of the remaining plurality of data frames may occupy in the data packet; and an input to the to the variable rate coder for providing a maximum rate dependant on the size that the remaining plurality of data frames may occupy in the data packet.

17. The apparatus of claim 16 wherein the data frame control further comprises circuitry for determining the maximum size of the data packet, determining a maximum size the plurality of data frames may occupy in the data packet; and subtracting the maximum size the plurality of data frames may occupy in the data packet from the maximum size of the data packet.

18. An apparatus for creating a data packet from a plurality of data frames provided by a variable rate coder, the method comprising:

a data frame control for determining a maximum size the plurality of data frames may occupy in the data packet;

a data frame sizer for accepting a first data frame of the plurality of data frames, to be incorporated into the data packet, from the variable rate coder; and circuitry for determining an average size that the remaining plurality of data frames may occupy in the data packet, forming a comparison by comparing average size that the remaining plurality of data frames may occupy in the data packet to the average size of at least one previously coded frame, and for providing a maximum rate to the variable rate coder based on the comparison.

19. The apparatus of claim 18 wherein the circuitry for determining a maximum size the plurality of data frames may occupy in the data packet farther comprises circuitry for determining the maximum size of the data packet and for determining a maximum size the plurality of data frames may occupy in the data packet, and for subtracting the maximum size the plurality of data frames may occupy in the data packet from the maximum size of the data packet.

20. An apparatus for controlling a variable rate vocoder, the apparatus comprising:
A) a data frame sizer for accepting an initial data frame, to be incorporated into a data frame bundle, from the vocoder;
B) a data frame control determining how much space remains in the data bundle when the initial frame is incorporated into the data frame bundle;
C) circuitry to determine the sustained rate for the remaining packets, and to set a maximum rate, for the variable vocoder, equal to the sustained rate.

21. The apparatus of claim 20 wherein the data frame control further comprises circuitry for setting a maximum rate, of the variable frame vocoder, for the initial data frame.

22. The apparatus of claim 20 wherein the circuitry for determining how much space remains in the data bundle further comprises circuitry to determine a maximum size for an over the air packet, of which the data frame bundle will be a part, circuitry to determine a size of a header which will comprise a portion of the over the air packet and circuitry for subtracting, from the maximum size for an over the air packet, the size of the header and a size of the initial frame.

23. The apparatus of claim 20 further comprising circuitry for controlling all frames until all frames which will be incorporated into the data frame bundle are incorporated into the data frame bundle.

24. An apparatus for controlling a variable rate vocoder, the apparatus comprising:
A) a data frame sizer for accepting, from the vocoder, an initial data frame to be incorporated into a data frame bundle;
B) a data frame control for determining how much space remains in the data bundle when the initial frame is incorporated into the data frame bundle;
C) circuitry using the space remaining in the data bundle to determine the sustained rate for the remaining packets; and
D) circuitry for setting a maximum rate, for the variable vocoder, equal to the sustained rate.

25. The apparatus of claim 24 further comprising circuitry for accepting additional data frames; and for processing frames until all frames, which will be incorporated in the data frame bundle, are incorporated in the data frame bundle.

26. An apparatus for creating an over the air packet in a cellular telephone, the apparatus comprising:
an input for accepting an input signal to the cellular telephone;
an input conditioner for conditioning the input appropriately and providing a conditioner output signal;
an input to a variable rate coder for accepting the conditioner output signal;
a variable rate vocoder;
a vocoder control for controlling the maximum rate based on the rate of the data frames and the amount of space available for a data frames.

27. The apparatus of claim 26, wherein the input to the cellular telephone comprises a microphone.

28. The apparatus of claim 27 wherein the input conditioner includes a digitizer for digitizing the input signal.

29. The apparatus of claim 26 wherein the circuitry controlling the maximum rate comprises circuitry controlling the maximum rate based on the rates of already formed data frames.

30. The apparatus of claim 26 wherein the circuitry controlling the maximum rate comprises circuitry controlling the maximum rate based on the sustained rate.

31. An apparatus for creating a data packet from a plurality of data frames provided by a variable rate coder, the apparatus comprising:
means for determining a maximum size the plurality of data frames may occupy in the data packet;
means for accepting a first data frame of the plurality of data frames, to be incorporated into the data packet, from the variable rate coder;
means for a size of the remaining plurality of data frames may occupy in the data packet; and
means for providing a maximum rate to the variable rate coder dependant on the size of the remaining plurality of data frames may occupy in the data packet.

32. An apparatus for creating a data packet from a plurality of data frames provided by a variable rate coder, the method comprising:
means for determining a maximum size the plurality of data frames may occupy in the data packet;
means for accepting a first data frame of the plurality of data frames, to be incorporated into the data packer, from the variable rate coder;
means for determining an average size of the remaining plurality of data frames may occupy in the data packet;
means for forming a comparison by comparing average size of the remaining plurality of data frames may occupy in the data packet to the average size of at least on previously coded frame; and
means for providing a maximum rate to the variable rate coder based on the comparison.

33. An apparatus for controlling a variable rate vocoder, the method comprising:
A) means for accepting an initial data frame, to be incorporated into a data frame bundle, from the vocoder;
B) means for determining how much space remains in the data bundle when the initial frame is incorporated into the data frame bundle;
C) means for using the space remaining in the data bundle to determine the sustained rate for the remaining packets; and
D) means for setting a maximum rate, for the variable vocoder, equal to the sustained rate.

34. An apparatus for controlling a variable rate vocoder, the method comprising:
A) means for accepting, from the vocoder, an initial data frame to be incorporated into a data frame bundle;
B) means for determining how much space remains in the data bundle when the initial frame is incorporated into the data frame bundle;
C) means for using the space remaining in the data bundle to determine the sustained rate for the remaining packets; and
D) means for setting a maximum rate, for the variable vocoder, equal to the sustained rate.

* * * * *